Nov. 3, 1970  D. R. CRAIG  3,537,782
THREE-DIMENSIONAL MOTION PICTURE FILM PROJECTION
SYSTEM USING CONVENTIONAL FILM
Filed Sept. 23, 1968  3 Sheets-Sheet 2
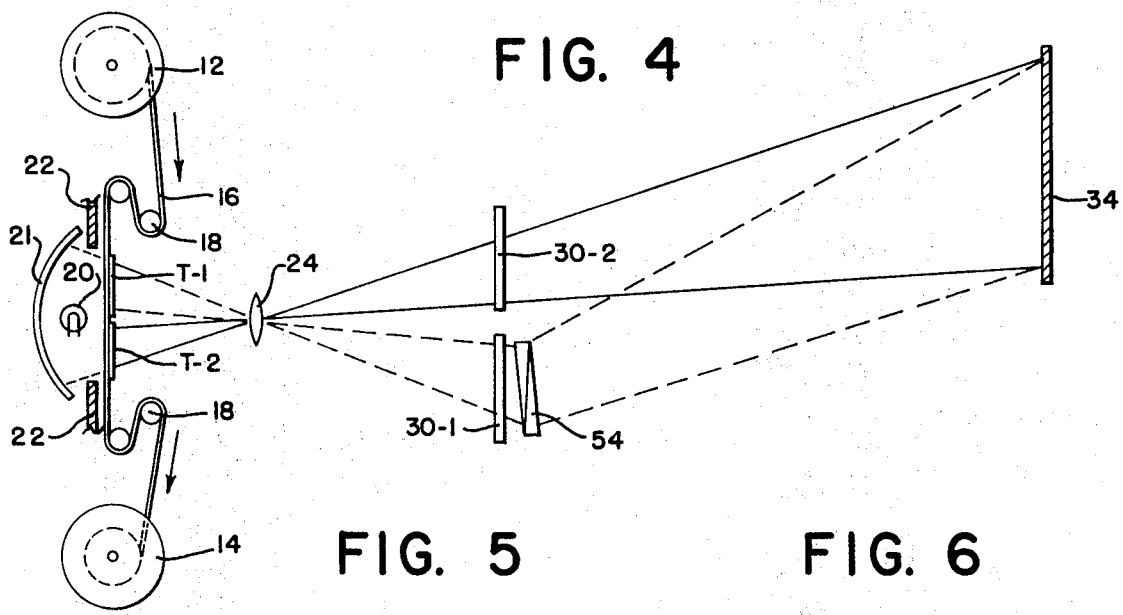
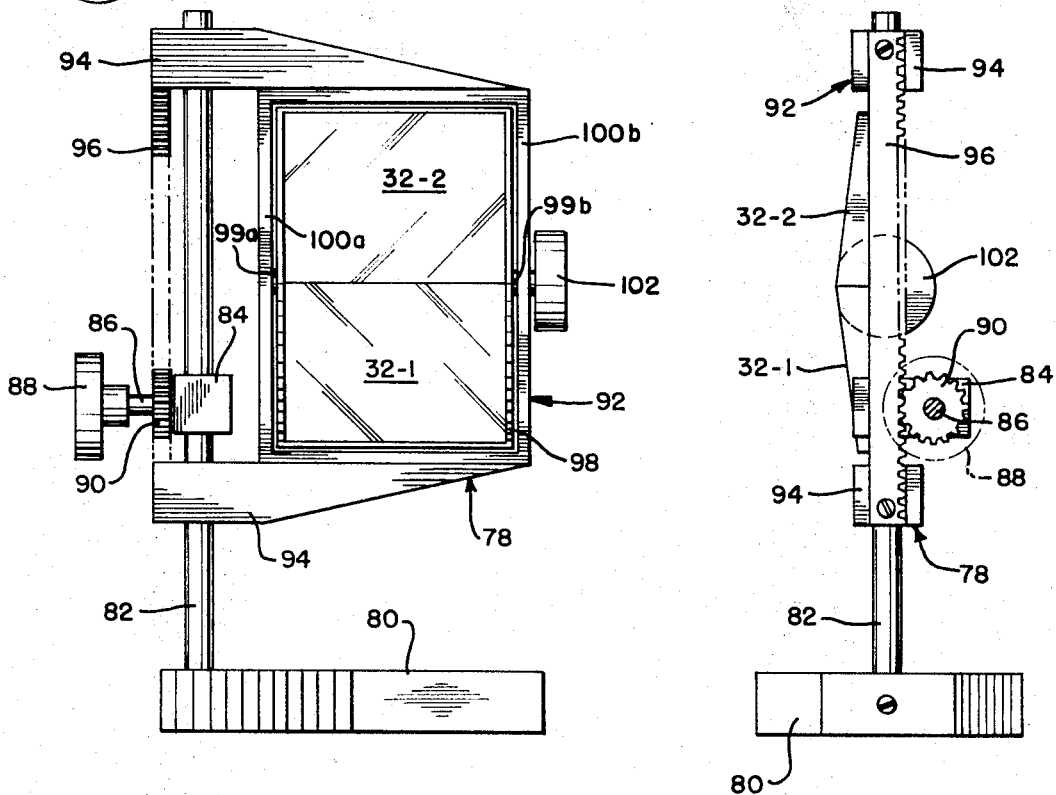
INVENTOR
DWIN R. CRAIG
BY Darby & Darby
ATTORNEYS 3,537,782
THREE-DIMENSIONAL MOTION PICTURE FILM PROJECTION SYSTEM USING CONVENTIONAL FILM
Dwin R. Craig, Gaithersburg, Md., assignor to Fairchild Hiller Corporation, Germantown, Md., a corporation of Maryland
Filed Sept. 23, 1968, Ser. No. 761,705
Int. Cl. G03b 21/32
U.S. Cl. 352—86  15 Claims

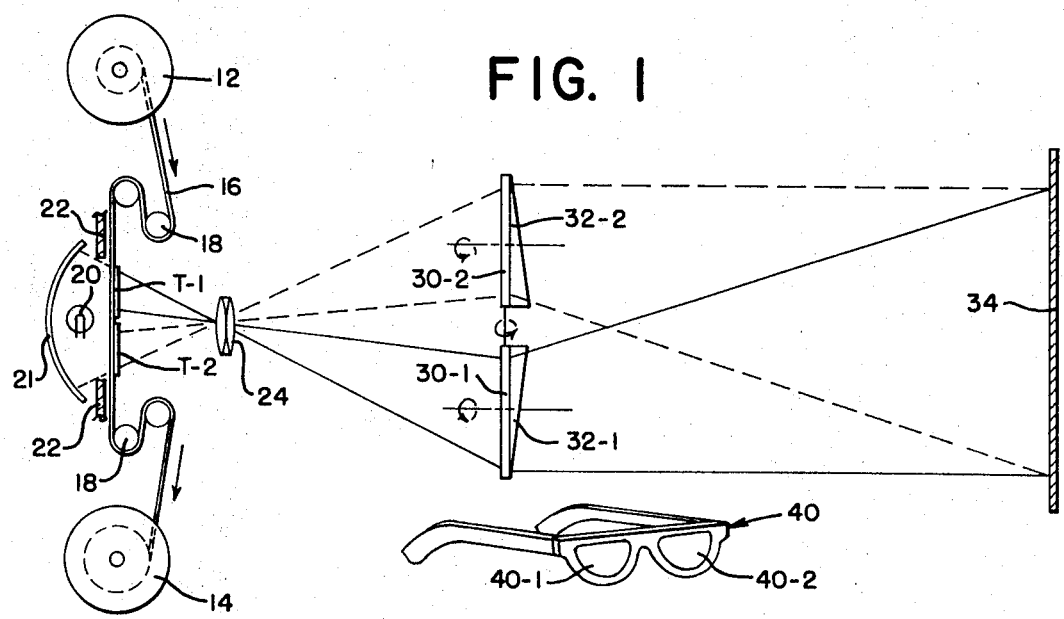
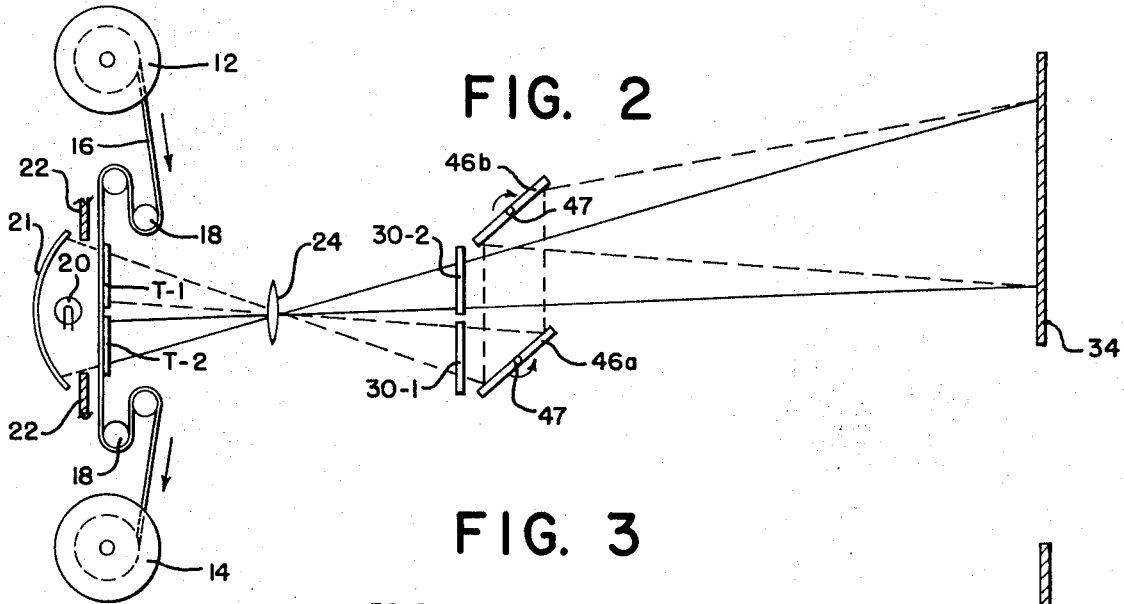
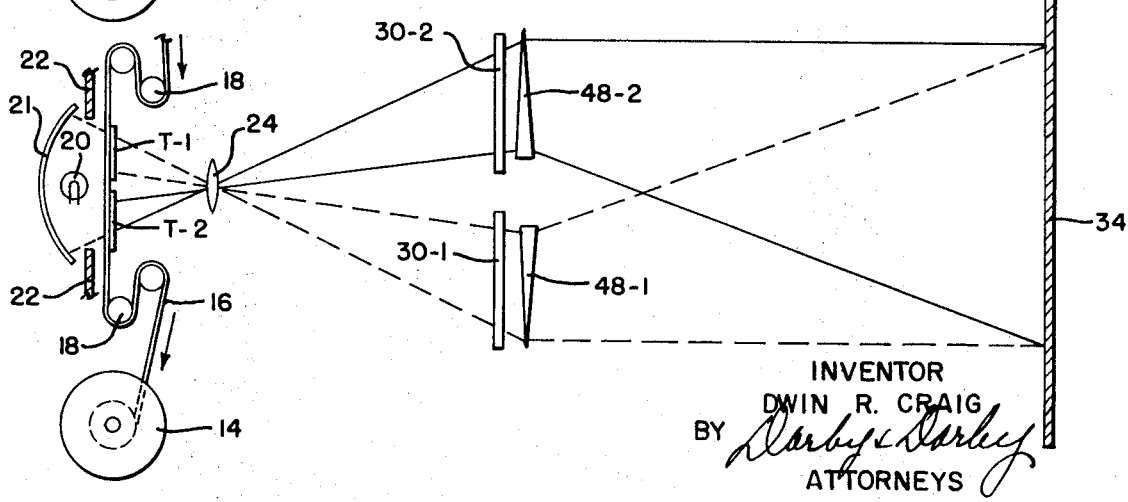

ABSTRACT OF THE DISCLOSURE

A system for projecting conventional motion picture film with a three-dimensional effect, including a projector having a film gate sufficiently large so that two frames of film can be simultaneously projected therethrough. An optical system is positioned outside the focal plane of the projector lens and includes two polarizing members for imparting a predetermined phase to each image of the two frames being projected. At least one of the images also has its light rays bent by an optical component and the two images are projected onto a screen in substantial registration. When viewed through a pair of spectacles with suitable polarizing filters, each eye sees the image of one of the frames projected and the two images are registered in the brain with the spatial displacement between objects in the consecutive frames producing the three-dimensional effect. Several novel embodiments of holders for the optical components of the system which can be readily used with motion picture projectors are also disclosed.

This invention relates to motion picture projection systems and more particularly to a system for projecting conventional motion picture film, which was originally taken in the usual manner without the aid of any special equipment, onto a screen to produce a three-dimensional effect.

Systems for projecting motion picture film to produce a three-dimensional or stereoscopic effect are well-known in the art. In general, such systems comprise a special camera in which two pictures of a scene are taken by separte cameras located at spatially separated points. The two frames of film taken in this manner are then projected onto a screen through a two-lens system and a viewer looks at them through a suitable device to produce a three-dimensional effect.

While the aforesaid three-dimensional camera and projector system, and systems of a simalar type operate to serve their intended function, at least the two camera arrangement is relatively complex, expensive to produce, and difficult to operate. These disadvantages have restricted the use of three-dimensional motion picture film by both home or hobby type camera enthusiasts as well as by most commercial enterprises.

The present invention relates to a system wherein any motion picture film taken in a conventional manner by a conventional single lens camera can be projected to have a three-dimensional effect. The system relies upon the spatial displacement and/or motion giving use to displacement, which is usually present between, or produced by the same object in a scene in successive frames of a motion picture film. The three-dimensional effect produced by the system of the present invention is not what is considered a true three-dimensional effect, in the sense of taking two pictures of the same object from two separate positions. Therefore, it can be considered to be a synthetic stereo effect. However, the synthetic stereo effect is visible and pronounced and, in most cases, is quite pleasing. By using the system of the present invention, many feet of amateur and commercial conventional film which is already in existence and other film taken in the future can be projected to have a three-dimensional effect.

In accordance with the present invention, a conventional projector is utilized whose film gate is modified to the extent that two frames of film can be projected therethrough simultaneously. The light rays of the images of the two frames of film pass through the projector's conventional lens and diverge outwardly therefrom. An optical system is located outside of the focal plane of the projector lens and this system has a polarizing member for imparting a respective predetermined phase to the light rays forming each of the images. One or both of the images formed by the light rays is bent by an optical component so that the two images can be projected onto a screen in substantial registration. As indicated above, the special difference between two successive frames of film will be visible in a manner to produce a three-dimensional effect. The spatial difference changes as the frames of the film are sequentially projected.

By being able to locate the optical system for polarizing and bending the light rays outside of the focal plane of the projector, several significant advantages are obtained. First of all, no extensive modifications are needed for the projector and/or its lens. In fact, the only modification necessary to a standard projector in accordance with the present invention is to enlarge its film gate from one frame to two-frame size. In addition, the optical system can be made of a relatively simple form utilizing components which are available and easy to construct and/or mount. Further, simple holders can be devised for the optical system which can be mounted directly to the projector or placed as a separate unit in front of the projector.

It is therefore an object of the present invention to provide a system for imparting a three-dimensional, or stereo, effect to motion picture film which is taken in the conventional manner.

Another object is to provide a system for producing a three-dimensional effect with conventional motion picture film, using an optical system which is located outside of the focal plane of the projector lens.

Another object is to provide a system for imparting a stereo effect to conventional motion picture film in which an optical system is positioned outside of the focal plane of the projector lens, the optical system including two polarizers, one each for imparting a predetermined phase to the light rays from an image of a frame of film being projected and at least one optical component to bend the light rays of a respective image so that they are projected onto the screen in substantial registration with the other image.

Other objects and advantages of the present invention will become more apparent upon reference to the following specification and annexed drawings, in which:

FIG. 1 is a schematic view in elevation showing the preferred embodiment of the camera system of the present invention;

FIGS. 2–4 are schematic views, also in elevation, showing other embodiments of the invention;

FIGS. 5 and 6 are front and side elevational views respectively, of a holder for the polarizing filtered light bending optical elements of the embodiment of the invention shown in FIG. 1 which can be used with a standard projector;

Figure 7:
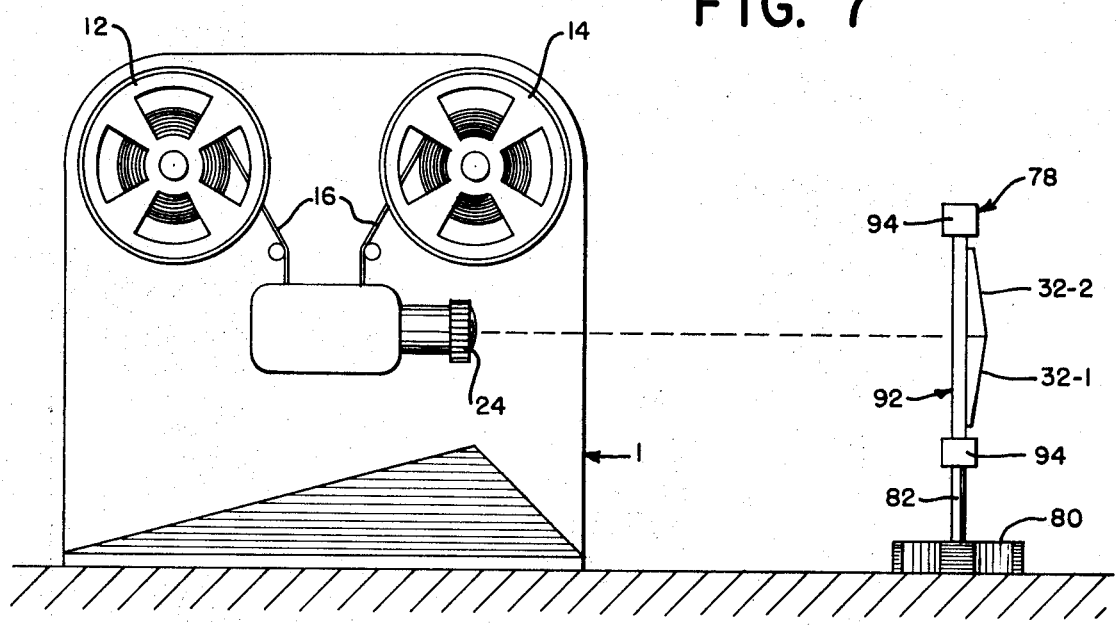
FIG. 7 is side elevational view showing the holder of FIGS. 5 and 6 and its relationship to a projector.

Referring to FIG. 1, portions of a conventional motion picture projector are shown including a film supply reel 12 and a film take-up reel 14. A conventional drive mechanism (not shown) is provided for moving a film 16 one frame at a time from supply reel 12 past a film gate 22 to take up reel 14 over a plurality of rollers 18. A light source 20 for projecting the film is positioned in front of a parabolic reflector 21. The light from the reflector passes through film gate shown at 22 which is shown having an opening large enough so that the light rays from the source 20 simultaneously illuminate two frames of the film 16, designated T-1 and T-2, at any given instant. A lens 24 for the projector is mounted in the conventional manner in front of the film and projects the converging rays of the images from the two frames of film T-1 and T-2 in a diverging pattern of the light rays of two separate images toward a screen 34. In all respects, except for the enlargement of the film gate 22 so that two frames may be projected simultaneously, the projector is of conventional construction. Therefore, the details thereof are not shown.

The projection of two frames of film simultaneously does not give use to an intolerable flicker problem. If a typical frame projection rate of 20 frames/sec. is assumed, using a conventional projector mechanism, the film is advanced one frame during each $\frac{1}{20}$ sec. interval. During this time the film is stationary while a rotary shutter intercepts the light 3 times to produce an impercetible flicker frequency of 60 cycles/sec. The shutter intercepts the light through T-1 and T-2 at the same rate but at slightly different times so that each eye receives an image whose flicker frequency is well above the visual threshold and the composite flicker frequency is even higher due to the slight phase shift introduced by the rotary shutter.

Located several focal lengths in front of the projection lens 24 is an optical system for polarizing and bending the images of the two film frames T-1 and T-2 projected through the film gate 22 and lens 24. By locating these optical components several focal lengths in front of the lens, good separation of the images is obtained solely due to their divergence through lens 24. Since there is good separation, it is easier to separately polarize the images of the respective frames without there being any optical interaction.

The purpose of the optical system is to project onto the screen 34, in substantial registration, the light rays forming the images of the two film frames T-1 and T-2. While it is desirable to have the images in good vertical register absolute register is not essential since they are viewed by separate eyes and are easily registered in the mind. The visual tolerance for vertical misregister also makes the distance from projector to screen relatively non-critical. Hence, fixed geometry convergence apparatus can be used based only on the focal length of the projection lens.

Some horizontal separation of the two images projected onto screen 34 is desirable for two reasons. A separation of images at the screen of approximately ½ the distance between the eyes is desirable in order to allow the eyes to converge at some distance beyond the screen. Furthermore, horizontal separation permits the right eye to see more of the image at the left border of the screen than can be seen with the left eye and also allows the left eye to see more of the image at the right border of the screen than can be seen by the right eye. The net result is that the screen appears to be a window through which the projected image is seen in the distance. Horizontal separation can be adjusted by rotating one or both of the light bending optical components about the optical axis of the projector.

The optical components of the system of FIG. 1 include a pair of light polarizers 30–1 and 30–2 and a pair of optical wedges 32–1 and 32–2. The dashed suffixes correspond to the images of the frame numbers T-1 and T-2. The polarizers 30 are of any suitable conventional material and polarizer 30–2 provides, for example, a shift of 45° while polarizer 30–1 provides a shift of 135°. A respective optical wedge 32–1 and 32–a is located adjacent each of the polarizers 30 on the side opposite projector lens 24. The optical wedges 32 also are of any suitable conventional material. For best results color corrected wedges are used. While the optical wedges 32 are shown spaced from the polarizers 30, if desired, the polarizing material can be directly affixed to the optical wedges by any conventional technique, such as by an adhesive or mounted in proximity thereto such as by a frame.

The separation between the centers of consecutive frames on film is well standardized in the motion picture industry. When the two frames are projected by a single lens, such as lens 24, the optical axes of the two projected images diverge at an angle which is inversely proportional to the focal distance of the lens being used. The converging, or light bending, apparatus in the front of the projector must be designed to produce an angle of convergence equal to the aforementioned angle of divergence. If prisms or wedges are used they can be tilted slightly to adjust the angle of convergence to match the focal length of the lens. If mirrors are used they can be tilted to provide convergence over a much wider range of angles. On the other hand, many projectors now use zoom lenses (the focal length is variable) so that the zoom function can be employed to match the convergence angle of a fixed prism place in the optical path. Since the two eyes view separate images, as the system of the present invention, absolute vertical registration is not essential so that a mismatch of approximately 1° between angles of divergence and convergence can be visually tolerated. The polarizers and wedges are shown rotatable about both horizontal and vertical axes to adjust vertical and horizontal registration of the images.

In operation the two images from frames T-1 and T-2 diverge through the lens 24 and pass through the respective polarizer-light bending element pairs 30 and 32. The polarizers shift the phase of the light from the image by a predetermined amount in a well known manner and the polarized images are then bent by the wedges for a predetermined amount to image on the screen 34 in approximate registration. The screen 34 is of the non-depolarizing type.

To complete the system of FIG. 1, a pair of "3D" spectacles 40 are shown. The lenses 40–1 and 40–2 of the spectacles, for the left and right eye respectively, are each made of a suitable polarizing material corresponding to one of the polarizers 30 so that the two images of the frames T-1 and T-2 projected on the screen 34 are depolarized and reconstituted, one frame for each eye. For reasons explained below, the polarization of the images of frames T-1 and T-2 and the selection of the filters for the specttacles 40 are such that the right eye sees the image only from "present" frame T-1 and the left eye sees the image only from "future" frame T-2.

Any spatial displacement between the same objects in the two frames projected on the screen 34 and seen by the eyes at the same time is registered in the brain. It is this spatial displacement which produces the three-dimensional stereo effect. How this three-dimensional effect occurs is described in greater detail below.

The system of the invention makes use of a film 16 for the projector which is of a conventional single lens type of any given size. The picture on the film is taken in the usual manner by a conventional motion picture camera with no special attachments, that is, the picture is taken one frame at a time. Projection of the film is as described above with respect to FIG. 1.

It should be understood that in practically all motion pictures, there is a change in the relative positions of objects in a scene between consecutive frames of photography. It is this lack of identity between the relative positions of objects seen by the left and right eyes, due to their viewing the separate frames only through the polarizing system which is psychologically interpreted as depth in the projected images.

The relative positions of objects in a scene will change thereby producing spatial displacement due to motion of the camera, motion of an object relative to its background, motion of an object relative to another object in the foreground, rotation of an object, etc. When there is absolutely no motion between consecutive frames, the three dimensional (stereoscopic) effect vanishes. However, an extremely large percentage of motion picture photography contains at least one of the aforementioned types of motion—most of which can be regarded as a difference in the lateral position of the observer, or viewer, between any pair of consecutive film frames. The lateral separation is psychologically equivalent to a physical separation between the left and right eye. When the effective lateral separation is exactly equal to eye spacing, and in the proper direction, the observer perceives a true three dimensional, or stereo, view of the scene. When the separation is greater, as in taking a motion picture from a fast moving vehicle, the three dimensional effect is greatly exaggerated and depth can be perceived in far distant objects.

A lateral shift also occurs between an object's position in successive frames of film when a stationary camera rotates to track a moving object. Here the relative motions between the object and the foreground and/or background produces an approximation of lateral motion of the cemera. During a panoramic sweep of a landscape, for example, the camera seldom rotates about the lens but instead rotates about the axis of a tripod or an axis passing through the backbone of the photographer. In either case of the camera rotating, the lens of the camera experiences lateral motion.

One other case where lateral motion is produced is in the case of a zoom lens. In some rsspects this is similar to the camera moving toward the objects being photographed. In this case, objects near the optical axis remain centered in the picture whereas off-axis objects experience considerable lateral shift in the image plane and therefore exhibit the stereo effect.

The preceding three paragraphs describe a number of conditions which will produce the equivalent of a lateral shift in camera position between successive frames of a film and therefore will produce a stereo effect when two consecutive frames are simultaneously viewed by different eyes. To now consider the direction of the shift, if the camera is moving from right to left when the original photograph is being taken, then the projection system should be arranged so that the right eye sees the image formed by the "present" position of the camera, represented by frame T–1, and the left eye sees the image formed by the "future" position of the camera, represented by frame T–2. When this is true, the observer makes the proper interpretation of the distances to near and far objects. If the camera was moving from left to right then the presentation should be reversed so that the left eye sees the image from the camera's "present" position (T–1) and the right eye sees the image from the camera's "future" position (T–2). If the "true" stereo effect is to be seen at all times, then the presentation to the left and right eye must be quickly reversible to correspond to the direction of camera motion during original photography. If the presentation is not reversed, one would estimate that the observer would experience a "reverse" stereo effect about 50% of the time if only the possible effect of camera motion by itself is considered. The "reverse" stereo effect is defined as one in which each eye sees the wrong frame images e.g. in a left to right motion situation the left eye would see the image from T–1 rather than T–2 and vice versa.

The usual motion picture contains many different objects which move continuously or intermittently in unpredictable directions at unpredictable rates. Experience has shown that the average observer is unable to distinguish between "true" and "reverse" stereo since neither kind persists for very long at a time. In an elaborate projection system (such as a theater) the polarizers in front of the projector can be programmed to reverse as a function of predominant motion in each scene. In a simpler environment, such as home movies, the arrangement usually would have to be fixed for purposes of economy. The question then arises whether one direction of camera motion predominates over the other, that is, should frame T–1 be polarized to be viewed by the right or the left eye.

An analysis reveals that accepted U.S. traffic laws largely favor a camera which moves from right to left and the equivalent object motions. For example, in a moving vehicle, the movie camera is generally operated by the passenger rather than the driver and therefore is most apt to be pointed at scenery, signs, etc., along the right side of the road, relative to which the camera moves from right to left. When using a stationary camera, the traffic laws again dictate the direction of motion of near objects vs. far objects. A scene looking up, down or across a busy street will show that near objects (both automobiles and pedestrians) will be in their right lane moving to the right, while far objects move in the opposite direction. The same is true of the autos in a traffic circle, a track meet, a horse race, a carrousel, etc. As a matter of fact, the earth when observed from a stationary point in space exhibits the same traffic pattern. Therefore, in a simple system according to the present invention, the images of frames T–1 and T–2 and the spectacles 40 are preferably polarized for right to left motion so that the right eye sees the "present" scene of T–1 and the left eye the "future" scene of T–2. Of course, the reverse selection can be made, if desired.

The degree of synthetic stereoscopic effect obtained with the system of the present invention under a variety of conditions can be predicted on the basis of the following calculations. With a normal eye spacing of approximately 3 inches the average individual has strong depth perception at 15 feet. This requires angular convergence of the eyes of 1° wherein the ratio of eye spacing to object distance is 1/60. For synthetic stereo: an object must move against a stationary background through an angle of 1° between consecutive frames; or, an object may rotate through an angle of 1° between consecutive frames; or, a near and a far object may move in different directions at relative velocities which produce the effect of 1° rotation; or, the camera may be translated at a velocity which will produce the effect of an angular rotation of 1° between consecutive frames. All of these criteria can be summarized in the equation $S/D=1/60$ where S is the distance of lateral movement between consecutive frames and D is the distance from camera to object.

Silent movies operate at 18 frames per second whereas sound movies operate at 24 frames per second. For convenience of calculations, 20 frames per second will be used. The time interval between consecutive frames in this case is 1/20 second which reduces the equation $V/D=1/3$ or when expressed in terms of required velocity reduces the equation $V=D/3$. This specifies that an object 3 feet away must move with a lateral velocity of 1 foot per second to produce a strong stereoscopic effect between adjacent frames. This rate is equivalent to rather leisurely movement of the hands. A normal walking rate of 3 miles per hour is equal to 4 feet per second which produces a strong stereo effect when the individual is 12 feet from the camera. Motion pictures when taken from an automobile moving at 60 m.p.h. will produce when projected, a strong stereo effect for objects nearly 100 yards away. Conversely, vehicles moving at that rate and distance against a stationary background, when photographed with a fixed camera, will likewise produce a strong stereo effect.

Rotation of an object will also produce a stereo effect whose strength can be expressed exclusively in terms of angular velocity and will be independent of the distance from camera to object. Object rotation of 1° between consecutive frames at 20 frames per second requires a rotational rate of 20° per second, comparable to a rather slow turning of the head. A full revolution would require 18 seconds (3 r.p.m.) which could also correspond to a high speed vehicle in a wide turn being tracked by the camera.

It appears that the amounts of motion required for strong stereo effect do occur in consecutive frames and that right hand traffic laws permit prediction of the predominant directions of motion.

FIG. 2 shows another arrangement for causing the two images from frames T-1 and T-2 to convergence on the screen 34. Here, the image from frame T-2 passes through lens 24 directly to and through the polarizer 30-2 and projects directly onto the screen 34. The other image from frame T-1 passes through the lens 24 and the polarizer 30-1 onto a periscope-type mirror system formed by two mirrors 46a and 46b. The two mirrors are not parallel but produce an angle of convergence equal to one-half the angle by which the light path of the image from frame T-1 must be bent to be projected onto the screen. In the embodiment, as in FIG. 1, the optical elements also are located in front of the focal plane of the projector lens 24 which, as explained above, permits more ready use of the system without involving extensive modifications to the projector.

The spectacles 40 are not shown in FIG. 2, nor are they shown in the embodiments of FIGS. 3 and 4 to be described below. However, they are needed to reconstitute the frames T-1 and T-2, one in each eye.

The mirrors 46a and 46b are shown as being rotatably mounted about their respective central axes 47. By rotating the mirrors slightly, in one direction or the other, the image of frame T-1 can be made to appear slightly in front of, directly on, or in back of the screen 34. This provides a somewhat novel viewing effect which can alter, to a degree, the three-dimensional effect. This can be performed for novelty or to achieve a desired enhancement of the three dimensional effect for a given scene or series of scenes. The two mirrors 46a and 46b are also preferably rotatable transverse to the optical axis of the projector to provide for horizontal separation of the two images on the screen, if desired.

In FIG. 2, the screen 34 is above the optical axis of the projector. If desired, it can be located below the optical axis if the mirror system is made to operate with the image of frame T-2.

FIG. 3 shows another embodiment of a light bending and polarizing system. Here, a pair of prisms 48-1 and 48-2 are used, located in the optical path of the images of the respective frames T-1 and T-2. As can be seen, the prism 48-1 bends the light rays of the image projected from frame T-1 slightly upward and prism 48-2 bends the light rays of the image from frame T-2 slightly downward to converge upon the screen 34. The polarizing members and prisms are again located several focal lengths in front of the focal plane of the projector lens 24 and the polarizers 30 are shown separate from the prisms. As explained with respect to the optical wedges of FIG. 1, the polarizers can be fastened to or held in the same frame as the prisms 48. It is preferred that the prisms 48 be of the color corrected type to reduce the amount of color fringing which will be seen in the two images on the screen. However, since the color fringing is in the opposite direction through each prism, the net result is substantially a cancellation when each image is viewed by a different eye and combined in the brain of the viewer. The operation of the system is as explained previously.

FIG. 4 shows another embodiment of the invention in which the components of the projector are as previously described. Here, the light bending and polarizing system which is located several focal lengths away from the focal pane of the camera includes the pair of polarizers 30-1 and 30-2 and a single optical wedge or prism 54 operating with polarizer 30-1. As can be seen, the image from frame T-2 is projected slightly upwards and passes directly through the polarizer 30-2 onto the screen 34 without being bent. The single optical prism or wedge 54 is located in the optical path of the image T-1 after the polarizer 30-1. This provides a suitable upward bending of the light rays so that the image of frame T-2 will be projected upon the screen 34 in substantial registry with the image from frame T-1.

In FIG. 4 the screen 34 is shown located above the optical axis of the projector. By locating the prism 54 adjacent the polarizer 30-2 instead of the polarizer 30-1 and suitably orienting it, the screen 34 can be located below the optical axis. In the embodiment of FIG. 4 it is preferred that the wedge or prism 54 be of the achromatic type, such as one composed of crown and flint glass, or other materials having an appropriate index of refraction and dispersion properties to prevent color fringing.

FIGS. 5-7 show one form of holder 78 for the optical polarizing and light bending components of FIG. 1 of the present invention which can be readily and easily used with a movie projector. Here, a base 80 has an upstanding post 82 mounted thereon. A bearing block 84 is fixedly mounted on the post 82 and a shaft 86 is rotatably mounted in the block. A control knob 88 is mounted on the remote end of the shaft and a pinion gear 90 is fixed to the shaft 86 to rotate therewith as the knob 88 is turned.

A frame 92 has upper and lower arms 94 with openings therein so that the post 82 can pass through. The frame is cut out between the arms 94 to permit passage of the mounting block 84. A toothed rack 96 is also mounted between the upper and lower arms 94 and engages the pinion gear 90. Thus, as can be seen, rotating the control knob 88 raises and lowers the frame 92.

The two wedges 32 are held within a rectangular inner frame 98. Frame 98 has a respective pin 99a and 99b on each side thereof. The pin 99a on the left side rides in a cross-member 100a of the main frame 92 which connects the two arms 94. The other pin 99b passes through a second cross member 100b of the main frame and has a control knob 102 mounted on the end thereof. This permits angular rotation of the two wedges 32 as a single unit. The polarizers 30-1 and 30-2 are located on the back side of each of the respective prisms and they are not shown in the drawings. These rotate with the wedges.

FIG. 7 shows the holder 78 of FIGS. 5 and 6 mounted in front of a projector 1 with the supply and take-up reels 12 and 14 shown in the usual position together with a lens 24. The holder 78 provides for vertical adjustment of the optical wedge and polarizer holding assembly through the rack and pinion; longitudinal spacing with respect to the projector lens by movement of the holder; and also angular rotation of the prism by rotation of the control knob for the inner frame 98. Thus, all of the necessary adjustments can be made in a very simple manner. As should be apparent, the holder 78 is relatively simple and inexpensive in its construction and no modification is required of the projector for its use. It should also be understood that the holder 78 can be used to mount the prism system of FIG. 3.

Figure 8:
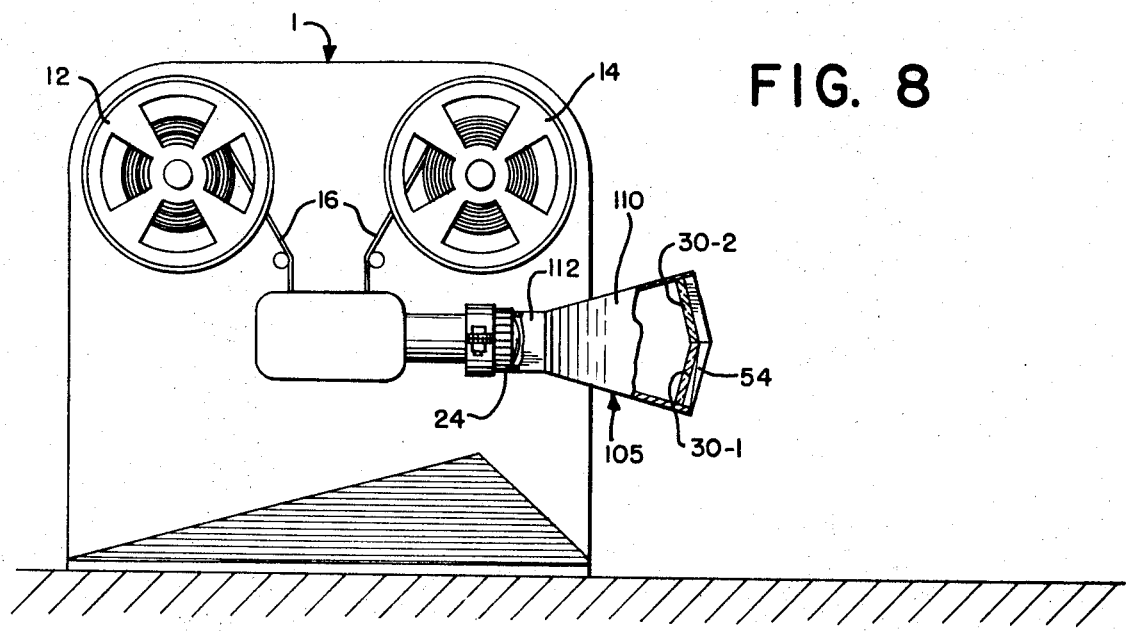
FIG. 8 is a side elevational view of another type of holder for direct attachment to a projector and incorporating the optical system of FIG. 4.

FIG. 8 shows another embodiment of holder 105 for the optical bending and polarizing components which is mounted directly onto the lens mount of the projector. Holder 105 has a housing 110 with a reduced diameter end portion 112 which fits over the end of the barrel of projector lens 24. Any suitable fastening arrangement can be used for fastening the holder to the projector or a sized bit of housing to lens barrel can be relied upon. The holder 105 also can be provided with a clamp or arm which is fastened to another stationary part of the projector. The housing 110 has an enlarged end in which is mounted the two polarizers 30–1 and 30–2. Only one optical prism 54 is shown located adjacent the lower polarizer 30–1. Thus, holder 105 corresponds to the optical system of FIG. 4. Instead of using the two section optical wedge shown in FIG. 4, only a single optical prism is used. As should be apparent, the rays from frame T–2 pass upwardly through the polarizer 30–2 and the rays from frame T–1 will be bent upwardly by the prism 54. Thus, the screen 34 (not shown) will have to be located above the optical axis of the projector.

As should be apparent the holders of FIGS. 5–6 and 8, which are hardware embodiments of the optical systems shown in FIGS. 1 and 3 and 4 are quite simple and are fairly standard components. A relatively simple holder also can be made for the mirror type optical system of FIG. 2. These holders are easily used with the projector and no modifications, other than the film gate, is required for the projector.

While preferred embodiments of the invention have been described above, it will be understood that these embodiments are illustrative only, and the invention is limited solely by the appended claims.

What is claimed is:

1. A system for projecting motion picture films with a three-dimensional effect comprising:
   a projector, said projector having a film gate with an aperture sufficiently large to simultaneously project two frames of film, and means for advancing film one frame at a time, a light source on one side of the film gate and a projection lens on the other, the light rays of the images for each frame being projected by the lens in a diverging manner,
   a non-depolarizing screen onto which the images from the two frames of film are to be simultaneously projected, and
   an optical system interposed between the projector lens and the screen and located outside the focal plane of the projector lens, said optical system comprising first and second means for polarizing the light rays of a respective image to a different and predetermined phase, and means located adjacent one of said polarizing means for optically bending the light rays of the image passing therethrough for an amount sufficient to place it in substantial registration on the screen with the light rays of the image from the other frame.

2. A system as set forth in claim 1 wherein an optical light ray bending means is provided to receive the light rays from only one of said images, the light rays from the other image passing directly to the screen without being bent.

3. A system as set forth in claim 2 wherein the screen is located off of the optical axis of the projector.

4. A system as set forth in claim 1 where the optical light ray bending means comprises a pair of mirrors, one of said mirrors positioned to intercept the light rays of one of said images and the other mirror positioned with respect to the first to receive the intercepted light rays after reflection for projection onto the screen.

5. A system as set forth in claim 1 where the optical light ray bending means comprises an optical wedge.

6. A system as set forth in claim 1 wherein the optical light ray bending means comprises a prism.

7. A system as set forth in claim 1 where an optical light ray bending means is provided to receive the light rays from a respective image of a frame, said screen being located substantially on the optical axis of the projector, and the optical light ray bending means associated with each image projects its image onto the screen in substantial registry with the other.

8. A system as set forth in claim 7 wherein each of said light ray bending means comprises an optical wedge.

9. A system as set forth in claim 7 wherein each of said light ray bending means comprises a prism.

10. The system of claim 1 further comprising a holder means having a frame for holding said first and second polarizing means and said optical light ray bending means in a portion to receive the light rays from the images, and means for rotating said frame about an axis transverse to the optical axis of said projector.

11. The system of claim 10 further comprising means adjusting the position of said frame vertically relative to projector optical axis.

12. The system of claim 1 further comprising a holder means, means for fastening said holder means to said projector, said holder means having a housing, one end of said housing shaped and located to receive the light rays from the projector lens, said optical system being mounted within said housing.

13. The system of claim 1 further comprising a viewing means having a pair of polarizing members, one member for each eye, the polarizing members of the viewing means and the polarizing means of the optical system selected so that the right eye of the viewer sees the image of the frame first present in the film gate and the left eye sees the image of the frame most recently presented in the film gate.

14. A system as in claim 1 further comprising means for projecting said images onto said screen with fixed vertical registration and variable horizontal registration.

15. A system as set forth in claim 1 wherein said polarizing members are arranged so that each frame to arrive in the aperture is projected for viewing first by the left eye and then by the right eye.

References Cited

UNITED STATES PATENTS

| | | | |
|---|---|---|---|
| 2,232,774 | 2/1941 | Deninson | 352—43 |
| 2,415,550 | 2/1947 | Yarost | 352—62 |

DONALD O. WOODIEL, Primary Examiner